United States Patent Office 3,040,779
Patented June 26, 1962

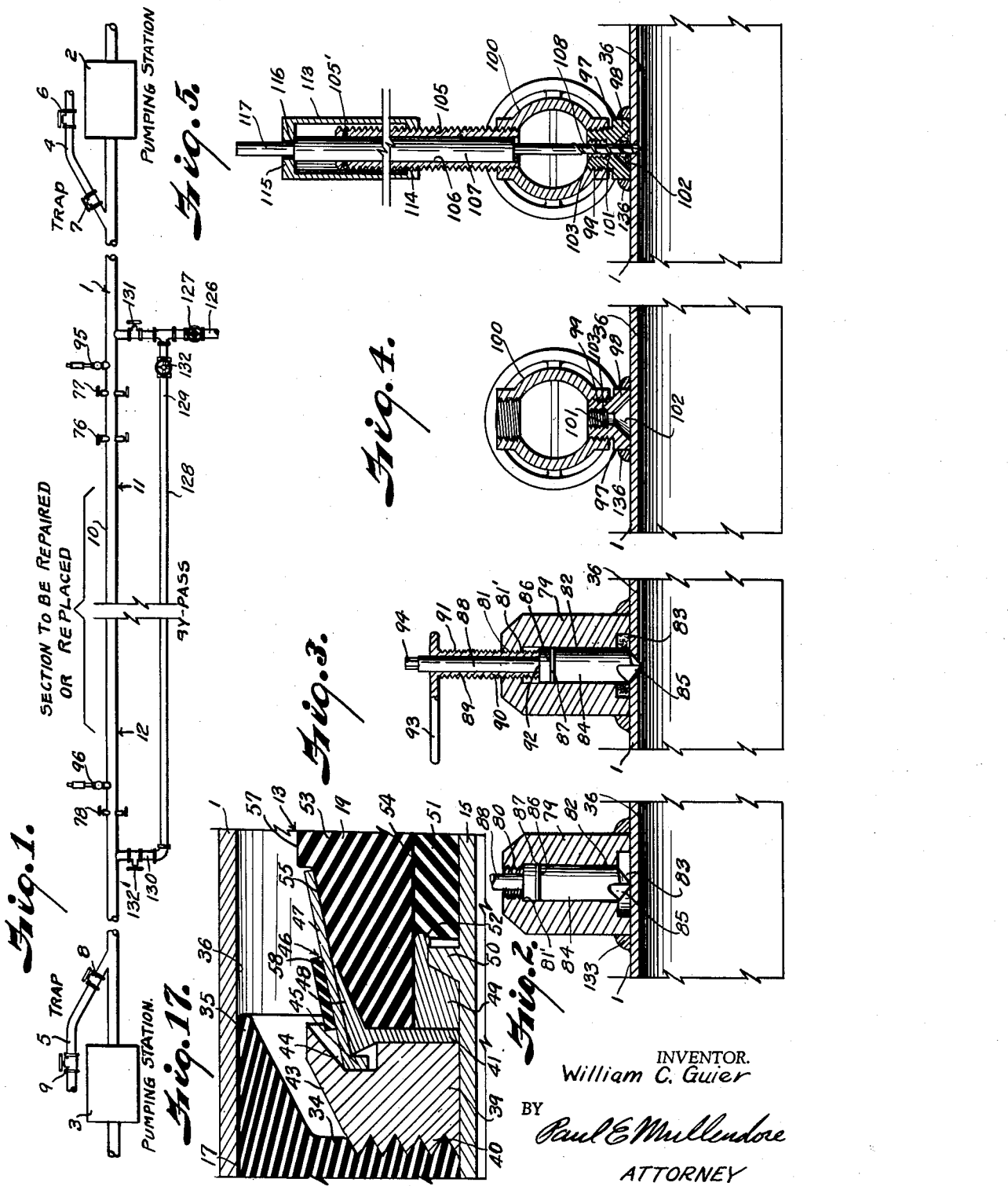

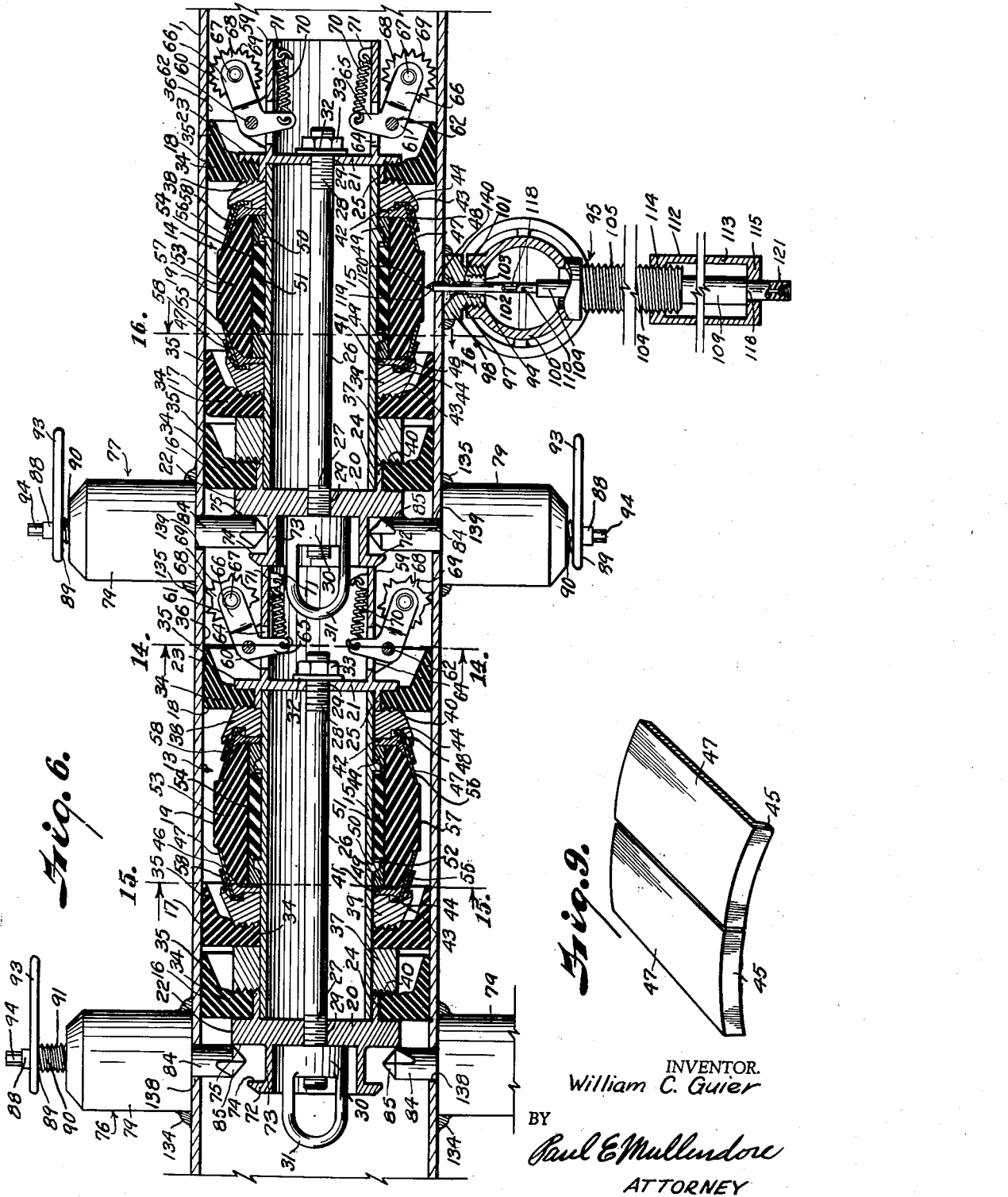

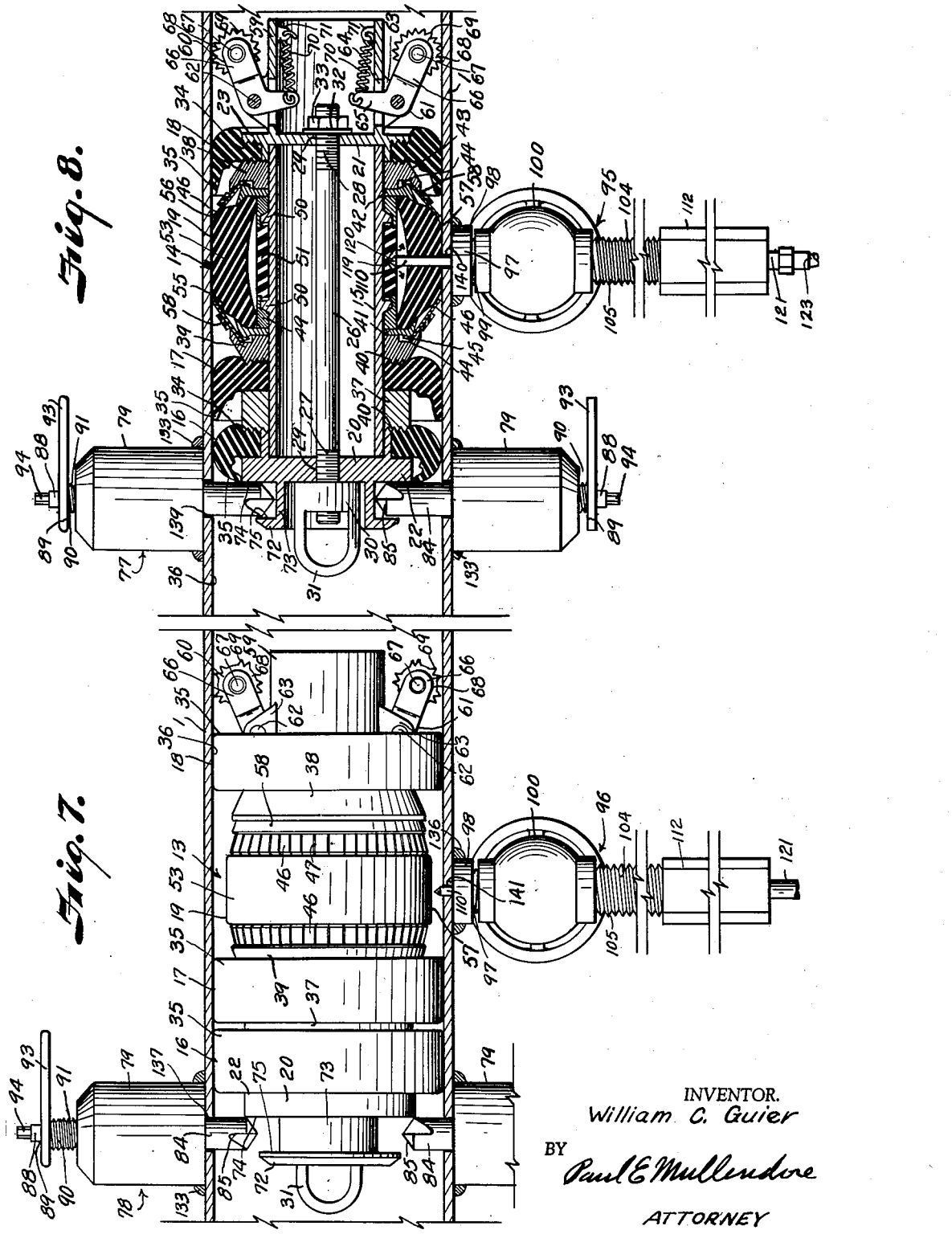

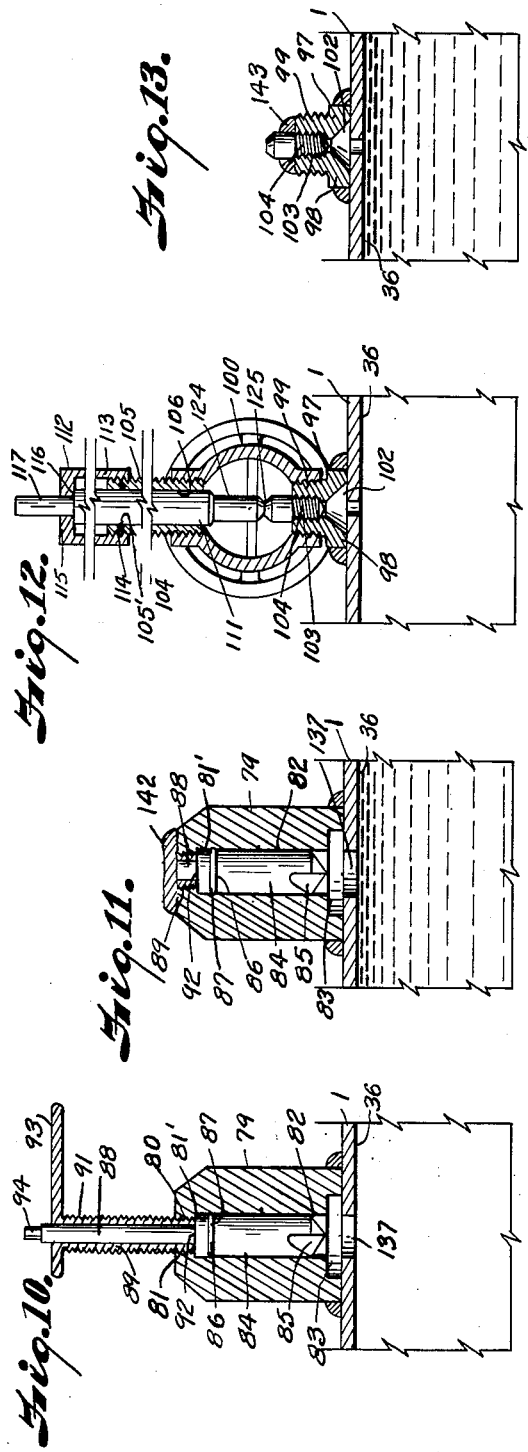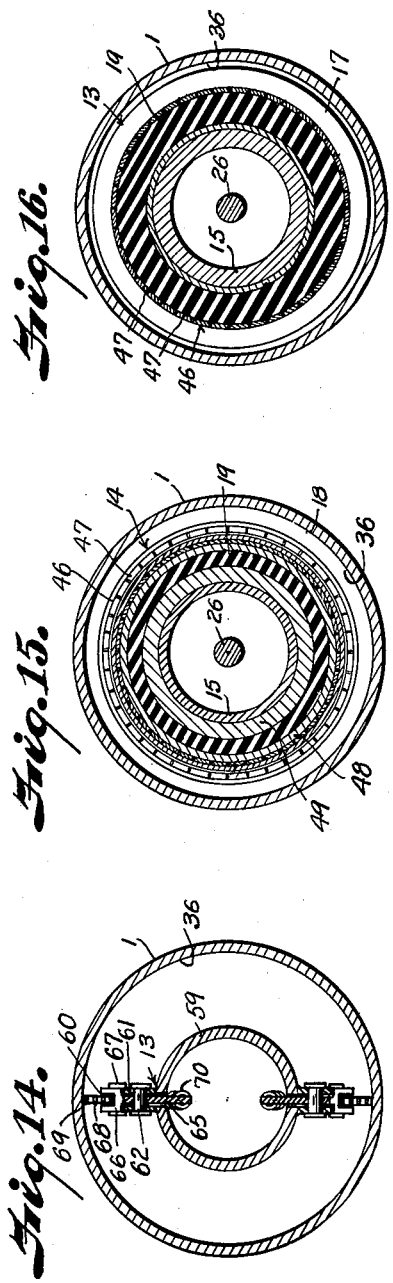

3,040,779
METHOD AND APPARATUS FOR BLOCKING OFF AND EMPTYING A SECTION OF PIPE LINE
William C. Guier, P.O. Box 326, Tulsa, Okla.
Filed Feb. 27, 1959, Ser. No. 796,115
25 Claims. (Cl. 138—97)

This invention relates to a method and apparatus for blocking off and emptying a section of pipe line when replacement or repairs are necessary thereto.

For example, pipe lines used in the transportation of petroleum oil, gas, petroleum products, and other fluids, may extend for several hundred miles or more, and being of large flow capacity and operating under high internal pressures, they contain tremendous quantities of valuable fluids. It is, therefore, imperative to keep the pipe line free of leaks, pipe line breaks, and other failures, to avoid loss of the valuable fluids and interruption to the pipe line service. Since such pipe lines are subject to corrosion, high stresses and other effects that result in pipe line failure, the pipe lines are under constant patrol and inspection to detect weaknesses that may exist, so that repairs can be made before pipe line failures and loss of fluids can occur.

Often an entire section of the pipe line must be replaced, or repairs or connections made thereto which require removal of the fluid therefrom. The pumping or compressor stations, as the case may be, may be shut down to stop further flow through the section to be replaced, and valves closed to shut off the pipe line on the up and downstream ends of the section to be replaced. However, due to the high cost of pipe line construction and the expense of such valves, the valves are located long distances apart. In some instances, the spacing between valves may be fifty or more miles. It is, therefore, obviously impossible to drain the fluid downstream, because the pipe line follows the contour of the ground and there will be many places in the pipe section between the shutoff point and the next downstream station that will prevent gravity flow of the pipe line fluid. Consequently, the section of pipe line between the shutoff points contains a large volume of valuable fluid, which cannot be emptied by way of the pipe line.

Heretofore, it has been necessary to erect storage tanks or provide ponds, tank cars or tank trucks at or near the site of the work, to temporarily store the pipe line fluid. Such temporary storage is quite expensive and requires considerable time for the provision thereof, particularly in remote locations where transportation of materials is difficult, and in many locations temporary storage is not practicable, and even then, it is not permissible to drain such pipe line fluids over the countryside.

In view of the foregoing, it is the principal object of the present invention to provide a method and apparatus whereby plug devices are effectively moved through the pipe line and expanded by injecting an inflating medium from exteriorly of the pipe into the packing elements thereof when the plug devices are in their required locations.

Other principal objects of the invention are to assure release of the packing elements of the plug devices from the pipe after repair of the pipe line has been completed, and to assure the movement of the plug devices to a place of removal after the pipe line flow has been reestablished.

Further objects of the invention are to provide a method and apparatus which utilizes the upstream pumping or compressor station to supply the extraneous fluid for moving the plug devices into position; to provide an improved plug device with an inflatable packing element that is retained out of contact with the pipe during positioning of the plug devices and which is adapted to be inflated with a pressure medium by means of a hollow needle adapted to be projected through the wall of the pipe and through the wall of the inflatable element, and which element automatically seals itself about the needle; to provide plug devices with means for restricting expansion of the packing elements to the circumferential direction thereof to frictionally engage the wall of the pipe; to provide stop means for selectively stopping and also holding the plug devices in both directions; to provide a simple method and apparatus for introducing the stops and which readily and effectively hold the plug devices under internal pipe line pressure and which stops may be readily sealed to close the opening in the wall of the pipe through which the stops are projected; to provide a simple apparatus for drilling openings for the needle elements and to project the needle elements through the wall of the packing elements; and to provide the plug devices with means to audibly indicate the rate of movement and position thereof in the pipe line.

In accomplishing these and other objects of the invention, I have provided improved structure, the preferred form of which is illustrated in the accompanying drawings, wherein:

FIG. 1 is a diagrammatic view of a portion of a pipe line between pumping or compressor stations and showing a section thereof to be replaced, and illustrating the location of the fittings which are applied to the pipe for controlling the plug devices.

FIG. 2 is a detailed fragmentary section showing application of a collar through which the stop elements are inserted through the wall of the pipe for stopping and releasing the plug devices.

FIG. 3 is a similar section, but showing a stop element and jack for backing and releasing the stop element.

FIG. 4 is a similar section showing one of the gate valves through which openings are drilled through the pipe for insertion of the needle elements.

FIG. 5 is a similar section, but showing the drill and jack mechanism therefor.

FIG. 6 is a longitudinal section showing the plug devices in tandem relation within the pipe, with the stop elements set to retain the rear plug device and the forward stop elements being withdrawn to release the foremost plug device for displacing the pipe line fluid from the section of the pipe line to be replaced.

FIG. 7 is a section through the pipe line showing the foremost plug device in stopped position just beyond the downstream end of the section to be replaced, and with the needle element in position for penetrating the expandable packing element by which pressure fluid, such as air, is introduced to expand the packing element and move the devices for controlling endwise expansion of the packing element into contact with the pipe.

FIG. 8 is a similar view of the upstream plug device after the packing element thereon has been inflated to provide a seal with the pipe.

FIG. 9 is a perspective view of two segments of the devices for controlling endwise expansion of a packing element.

FIG. 10 is a fragmentary section showing one of the stop elements completely withdrawn from the bore of the pipe.

FIG. 11 is a similar section showing the jack and stem of the stop element cut off and sealed across by a weld.

FIG. 12 is a section showing the method of introducing a threaded plug through one of the gate valves for closing the needle openings in the pipe and prior to breaking off the stem of the plug.

FIG. 13 is a similar section after the stem is broken off and the gate valve removed and showing the plug welded to the fitting by which the gate valve was connected to the pipe.

FIG. 14 is a cross section through a plug device taken on the line 14—14 of FIG. 6.

FIG. 15 is a cross section through a plug device taken on the line 15—15 of FIG. 6.

FIG. 16 is a cross section through a plug device taken on the line 16—16 of FIG. 6.

FIG. 17 is an enlarged fragmentary section through a portion of one of the plug devices to better illustrate a structure by which the expandable packing element is connected with the core thereof.

Referring more in detail to the drawings:

In FIG. 1 is illustrated one section 1 of a pipe line for transporting liquids such as crude oil from the field of production to distant refineries, or the products from the refineries to distant markets. Such pipe lines usually comprise a series of such sections interconnected by a pumping station, an upstream station being designated 2 and the next downstream station being designated 3 in the present drawing. The spacing between the pipe line stations depends upon the terrain which the pipe line traverses, pressure drop, rate of flow to be maintained, et cetera. Usually most of the equipment for operating pipe lines, such as the traps 4 and 5 for inserting and removing flow seperation plugs, scrapers, and similar devices that are forced through the pipe lines from one station to the next are located at the pumping stations, 6—7 and 8—9 designating the valves by which the plugs may be introduced into the traps under pipe line pressures. Between the pumping stations 2 and 3, the pipe line is composed of joints of pipe connected end to end, usually by welding. Ordinarily, there are no shutoff valves or prearranged connections between the pumping stations. Even in pipe lines which may be equipped with shutoff valves between stations, the valves are widely spaced apart, with long lengths of pipe therebetween. It is, therefore, obvious that between available shutoff points, the line will contain great quantities of fluid. Also, the pipe line follows the contour of the ground, up and down hills and under streams, so that the line cannot be drained of pipe line fluid merely upon shutting down the upstream pumping stations. Consequently, when sections of the line require repair or replacement, provision must be made for handling the pipe line fluid. The present invention contemplates forcing of the pipe line fluid through the pipe line and plugging off the pipe line at the ends of the section to be repaired or replaced, as now to be described.

The bracketed portion of the pipe line between the stations 2 and 3 designates a portion 10 thereof to be replaced by cutting through the pipe line at the points indicated at 11 and 12. However, before cutting out the portion, it is necessary to remove the pipe line fluid therefrom and to plug the ends of the pipe line on the outer sides of the proposed cuts 11 and 12. In accomplishing this portion of the invention, relatively simple and light weight plug devices are inserted in the pipe line to plug the pipe line at the outer sides of the proposed cuts 11 and 12.

In order to completely plug off the portion 10 of the pipe line, two plug devices 13 and 14 are used. The plug devices 13 and 14 are substantially of the same construction, which is illustrated in FIGS. 6, 7 and 14 to 17, inclusive. Each plug device includes an elongated tubular core 15 of a diameter relative to the inner diameter of the pipe line to carry two or more sealing cups. For example, three sealing cups 16, 17 and 18 are illustrated in the drawing, with a single packing element 19 intermediate the sealing cups 17 and 18. The ends of the core 15 are closed by disk shaped heads 20 and 21 of larger diameter than the core 15 to provide radially projecting annular flanges 22 and 23. The heads 20 and 21 have laterally extending annular flanges 24 and 25 encircling the ends of the tubular core 15 to retain the heads in coaxial relation. The head 20 is substantially thicker than the head 21, as it constitutes the part of the plug device that engages stops later to be described. In the illustrated instance, the heads 20 and 21 are secured to the core 15 by a tie rod 26 having exernally threaded opposite ends 27 and 28 projecting through axial openings 29 in the heads 20 and 21. Threaded on the end 27 of the tie rod 26 is a collar 30 that abuts against the outer face of the head 20 and carries a bail or loop 31 to assist in handling of the plug device. The opposite end 29 carries a washer 32 and a nut 33 which cooperate with the collar 30 to draw the parts together after the sealing cups and expandable packing element have been applied to the core.

The sealing cups 16, 17 and 18 are of like construction, and each includes a ring or web portion 34 having an outer diameter sufficient to carry laterally extending annular lip or flange portions 35 which under certain conditions provide liquid seals with the inner surface 36 of the pipe, and under other conditions reverse themselves to allow passing of fluid therearound. The heads 20 and 21 are of less diameter than the pipe to provide circumferential space to accommodate action of the cups. The ring portions 34 of the cups 16 and 18 encircle the flanges 24 and 25 on the heads and are clamped against the projecting flanges 22 and 23 by spacer rings 37 and 38 (FIG. 6). The ring portion of the intermediate cup 17 has an inner diameter to be sleeved over the tubular core 15 and to abut the spacer 37 on one side and to be engaged on the other by spacer ring 39. To enhance sealing contact of the spacer rings with the cups, the spacer rings may be provided with serrations or ribs, as indicated at 40. The spacer rings 37, 38 and 39 have inner diameters of a size to be sleeved snugly over the tubular core 15, so that they are movable into clamping engagement with the ring portions 34 of the sealing cups 16, 17 and 18 and to effect indentation of the ribs therein upon tightening of the nut 33. The spacer rings 37 and 38 are of similar construction to constitute supports for the expansion control devices 46 and abutments for clamping rings 41 and 42. The peripheries of the spacer rings 38 and 39 are beveled as at 43 toward the ring portions of the cups 17 and 18, and the inner faces thereof have annular grooves 44.

The expansion control devices 46 are made up of segments 47, having flanged or hooked ends 45, as best shown in FIGS. 9 and 17. Each segment 47 includes a plate-like body curved in the transverse direction thereof and which has a length to engage the wall of the pipe when the hooked ends 45 are engaged in the grooves 44 (FIG. 17) and the segments are moved outwardly responsive to inflation of the packing element 19. The hooked ends 45 of the segments are retained in the grooves 44 by the clamping rings 41 and 42. The clamping rings 41 and 42 have flaring lateral flanges 48 cooperating with spacing rings 49 to clamp the ends of the packing element 19 therebetween (FIG. 17) and provide leaktight joints when the packing elements are expanded as later described. The spacing rings 49 abut against the clamping rings 41 on one side and ribs 50 on the other, which ribs 50 are integral with the core 15. The ribs 50 accommodate therebetween a split or two-part resilient sleeve 51 having its ends abutting the adjacent inner face of the ribs 50 and end edges of annular flange portions 52 of the clamping rings 49 that overlap the outer peripheral faces of the ribs 50. The resilient sleeve 51 is to protect the needle used to introduce an inflating medium. If desired, the sleeve 51 may be omitted, and the space between the ribs 50 filled with a soft plastic-like material.

The expandable packing element 19 includes a sleeve-like body 53 having a bore 54 to pass over the circumferential faces of the spacing rings 49, with the ends thereof abutting against the flange side of the clamping rings 41 and 42. The outer faces of the end portions of the packing element 19 are tapered as indicated at 55 and 56 in accordance with the collapsed position of the segments 47 of the expansion control devices on guards 46 when they are in their retracted position, as shown in FIG. 6. The portion of the expandable packing element 19 intermediate the terminal ends of the segments 47 is of slightly larger diameter, and the outer face portion 57 thereof is substantially cylindrical to form a contact face with the inner surface of the pipe when the packing element is expanded (FIG. 8), as later described. The segments 47 are retained in their retracted or collapsed position by resilient bands 58 that are wrapped therearound, as best shown in FIG. 17. If desired, the segments may be attached to or bedded in the ends of the packing element, in which case the resilient bands 58 can be omitted.

Extending from the head 21 and substantially conforming to the diameter of the tubular core 15 is a tubular extension 59 for carrying signalling devices 60, each of which comprises a bell crank lever 61 having rocking support on transverse pins 62 that are carried by ears 63 extending outwardly from the face of the tubular extension on the respective sides of slotlike openings 64, whereby arm portions 65 of the bell crank levers 61 extend inwardly of the tubular extension. The other arms 66 of the bell crank levers 61 extend rearwardly and carry pins 67 on which rollers 68 are mounted. The rollers 68 have radially extending teeth 69 adapted for contact with the inner surface of the pipe. The teeth 69 of the rollers 68 are retained in contact with the pipe by springs 70 having one end connected with the inwardly extending arm portions 65 and their opposite ends connected with ears 71 projecting inwardly from the sleeve 59. When the plug device is moved along the pipe, the teeth 69 of the rollers 68 engage the pipe and produce a series of audible impulses of different frequencies, so that the audible sounds indicate the traveling rate and position of a plug device in the pipe when the plug device is moved into and out of position, as hereinafter described.

The head 20 at the forward end of the plug device has a forwardly extending annular flange 72 carried by an annular flange 73 integral with the head 20 (FIGS. 6, 7 and 8). The flange 72 cooperates with the head 20 to provide stepped stop faces 74 and 75, later described.

In using the plug devices 13 and 14, relatively simple appurtenances are connected with the portions of the pipe line to be plugged. These include a temporary stop means 76 upstream from the cutoff point 11 for stopping the foremost plug device 13. Also to be connected with the pipe upstream from the stop means 76 is a stop means 77 for the rear plug device (FIGS. 1 and 6). Downstream from the cutoff point 12 is a stop means 78 to stop the foremost plug device 13, after it has been released by the stop means 76 (FIGS. 1 and 7).

Each stop means is of the same construction, best illustrated in FIGS. 2, 3, 10 and 11, and each includes a collar 79 having an axial bore 80 provided with internal threads 81 which extend from the outer end of the collar to a shoulder 81' formed by a slightly larger smooth bore 82. The opposite end of the bore 82 terminates in a short counterbore 83. Rotatable and reciprocable in the smooth bore 82 is a cylindrical stop pin 84 having the end shaped to provide a drill 85 to bore through the wall of the pipe 1, as later described. The opposite end of the stop pin 84 has an annular groove 86 carrying an O ring 87 and extending from that end of the stop pin 84 and outwardly through the threaded portion bore is a stem 88 of smaller diameter than the threads 81 of the bore to accommodate a jack or crowder 89. The jack 89 comprises a sleeve 90 rotatable about the stem 88 and having external threads 91 engaging the internal threads 81 of the collar 79. The stem 88 forms an annular shoulder 92 with the stop pin 84, to be engaged by the end of the jack 89. The jack 89 is adapted to be rotated in the threaded portion 81 of the bore 80 by means of a handle 93. The stem 88 is of sufficient length to project from the jack, and the outer end thereof is provided with a polygonal shaped portion 94 adapted to be engaged by the chuck of an electric drill or the like with which the stop pin 84 is rotated to drill a hole through the wall of the pipe and to project the stop pin 84 therethrough to a position for engaging the stop faces 74 and 75, previously referred to.

Other appurtenances are means 95 and 96 (FIG. 1) to drill holes through the wall of the pipe and for injecting needles to inflate and expand the packing elements 19 into sealing contact with the wall of the pipe under pipe line pressures. The means 95 and 96 each comprise a fitting 97 (FIGS. 4, 5 12 and 13) having a base 98 adapted to be welded to the wall of the pipe line, and a reduced externally threaded portion 99 for attaching a conventional gate valve 100. The fitting 97 has an axial bore 101 provided at the base end with a conical counterbore 102 and an internally threaded counterbore 103 at the opposite end for inserting an externally threaded plug 104, to be later described in detail. Threaded into the opposite side of the gate valve is an externally threaded sleeve 105 having a smooth axial bore 106 adapted in one instance to contain the shank 107 of a drill bit 108, and in another instance the shank 109 of a needle 110, and in another instance the shank 111 of the plug 104. The shanks of the different tools are slidably and rotatably sealed in the sleeve by an O ring 105' (FIGS. 5 and 12) to prevent loss of pressure when the gate valve is opened. The shanks 107 are adapted to be moved in an axial direction toward the wall of the pipe by a jack or crowder 112 (FIG. 12) including a sleeve 113 having an internally threaded end 114 for engaging the threads of the sleeve 105, and the opposite end has an inturned flange 115 for engaging and turning upon a shoulder 116 formed by a reduced extension 117, which, in the case of the drill and plug, provides a means for engagement of a turning device, not shown.

In the case of the needle 110, the shank 109 has a through axial bore 118 that extends the entire length of the needle 110 and connects with discharge orifices 119 in the point 120 of the needle. The reduced extension 121 (FIG. 6) at the opposite end of the needle has a threaded connection 122 with a pressure medium supply duct 123 (FIG. 8) leading to a suitable source of supply.

The shank 111 of the plug 104 has a reduced portion 124 provided with an annular V-shaped groove 125 to facilitate twisting off of the shank when the plug 104 is tightened in the internally threaded counterbore 103.

Another appurtenance is a pipe connection 126 which is connected with the pipe line 1 upstream from the stop means 76 and through which a pressure medium may be injected under control of valves 127 and 131 to force the foremost plug 13 down the pipe line to move the pipe line fluid thereahead until the plug device is stopped by the stop means 78. While a pressure fluid to propel the foremost plug may be introduced by way of the valved connection 126, the connection 126 may be omitted and an external pressure medium may be introduced at the pumping station 2.

If it is desired to maintain the pipe line in service while the repair is being made, a bypass 128 (FIG. 1) may be provided and which has its upstream end 129 connected with the pipe 126 intermediate the valves 127 and 131, and its downstream end 130 connected with the pipe line below the stops 78. The ends of the bypass are provided with valves 132 and 132' to control flow of pipe line fluid through the bypass.

In setting up for running the plug devices 13 and 14, the stop pins 84 are inserted into the collars 79 and the collars 79 for the stop means 78 are welded to the periphery of the pipe 1 at opposite diametrical sides thereof at a point spaced downstream from the cutoff point 12 a sufficient distance so that all of the plug device 13 will be contained in the pipe line 1 and be clear of the cutoff point 12.

The collars 79 as they are applied to the wall of the pipe will appear as shown in FIG. 2, and the weld is indicated at 133. The collars 79 for the stop devices 76 are applied to the pipe line at a point upstream from the cut-off point 11 and secured by welds 134 (FIG. 6). The collars 79 for the stop means 77 are applied to the pipe line a distance upstream corresponding to the distance between the stop faces 75 of the plug devices 13 and 14 when the plug devices are in abutment as shown in FIG. 6, the latter collars being secured by welds 135.

The fittings 97 for the hole drilling means 95 and 96 are secured to the pipe by welds 136 (FIG. 5), the fittings being located a distance from the stop means 77 and 78 corresponding with the transverse midpoint of the packing elements 19 with respect to the stop faces 75 of the plug devices.

The connections for the pipe 126 and the downstream end 130 thereof will be connected with the pipe line as in accordance with the present practice of making pipe connections with pipe lines under flow.

After locating and welding the collars 79, the jacks 89 are sleeved over the stems 88 and turned into the threaded bore 80 of the collars so that the ends thereof engage the shoulders 92. A suitable rotating device, such as an electric drill, is connected with the portions 94 of the stems 88 to rotate the stop pins to cause the ends 85 to cut through the walls of the pipe as the stop pins 84 are being crowded into the pipe by the jack or crowding devices 89 (FIG. 3). The cuttings made by the ends 85 are trapped in the counterbores 83, which may be filled with a grease to catch the cuttings. After the stop pins 84 have produced openings 137, 138 and 139 (FIGS. 6, 7 and 8) through the walls of the pipe, the stop pins 84 for the stop means 76 and 78 are projected into the pipe by the crowders 89 a distance so that the flanges 72 will pass the inner ends of the stop pins, but the stop pins will be in position to engage the stop faces 75 of the heads 20 of the plug devices. The stop pins 84 of the stop means 77 are retracted within the openings 139 to permit free passage of the foremost plug device 13.

The gate valves 100 are secured to the fittings 97 and the externally threaded sleeves 105 are secured to the opposite sides of the gate valves, after which the drill bits 108 are inserted through the open upper ends of the sleeves 105 with the stem portions 107 sliding through the bores 106 until the points of the drill bits 108 rest on the pipe. The crowding devices 113 are then applied by turning them upon the threads of the sleeves 105 until the flanges 115 thereof engage the shoulders 116. Suitable rotating mechanisms are applied to the reduced extensions 117 and the drill bits are rotated to produce holes 140 and 141 in the walls of the pipe line 1 (FIGS. 7 and 8). In this instance the cuttings are caught in the conical counterbores 102 (FIG. 4) also containing a grease or the like to trap the cuttings therein. The crowders 113 are then backed off so that the drill bits move outwardly to a point where they clear the valving elements of the gate valves 100. The gate valves are then closed below the drill bits, after which the crowding devices are unscrewed from the sleeves 105 and the drill bits are withdrawn.

The needles 110 are then inserted, after which the crowders 113 are again applied to the externally threaded sleeves 105 and they are turned thereon until the internal flanges 115 seat against the shoulders 116 of the shanks 109 of the needles 110. The gate valves are again opened so that the needles 110 are projected through the bores 101 and in a position ready to penetrate the packing elements 19, however, they are left in retracted position so that the sealing cups of the plug devices will freely pass the needles.

The plugs are assembled by first placing the split or two part sleeve 51 on the tubular core 15 between the spaced apart ribs 50. The clamping rings 49 are then sleeved over the respective ends of the tubular core 15 and seated against the outer sides of the ribs 50 with the flanges 52 overlapping the ribs 50 and abutting the ends of the split sleeve 51. The sleeve like body 53 which forms the expandable packing element 19 is sleeved from one end of the core 15 over the clamping rings 49 and split sleeve 51. The clamping rings 41 and 42 are sleeved over the respective ends of the core 15 with the flaring flanges 48 thereof engaging over the tapered ends 55 and 56, respectively, of the packing element 19. The hooked ends 45 of the segments 47 of the control devices 46 are inserted in the grooves 44 of the spacer rings 38 and 39 and the assemblies are sleeved over the ends of the core 15 with the spacer rings abutting the clamp rings 41 and 42 and the segments 47 lying flatly upon the tapers 55 and 56. The elastic bands 58 are then wrapped around the segments 47 to retain them in yielding contact with the packing element 19 and normally out of contact with the wall of the pipe 1. The sealing cup 17 and spacer ring 37 are sleeved over the core until stopped by the spacer ring 39. The sealing cups 16 and 18 are applied to the flanges 24 and 25 of the heads 20 and 21, after which the head assemblies are placed upon the ends of the tubular core 15 with the flanges 24 and 25 sleeved over the ends thereof. The collar 30 may then be applied to one threaded end 27 of the tie rod 26. The other end 28 of the tie rod 26 is passed through the core 15, and through the opening 29 in the head 21. The washer 32 and nut 33 are then applied and the nut 33 is drawn up tight against the washer 32 to draw the assembly tightly together, with the ridges 40 pressing tightly into the material of the sealing cups and the flaring flange portions 45 of the washers 41 and 42 drawing the tapered ends of the packing element 19 tightly against the peripheries of the spacing rings 49 to provide leaktight seals around the tubular core 15 and at the ends of the packing element 19. In place of the split or two part sleeve 51, the space between the ribs 50 may be filled with a plastic material which is yieldable under pressure of the needles to open up a space under the sleevelike body of the packing element 19 to facilitate starting the expansion thereof, as later to be described.

After the plug devices have been assembled, they are inserted in the trap 4 at the pumping station 2. This is accomplished by opening the valve 6 while the valve 7 is closed. The plug devices 13 is first inserted into the trap, followed by the plug device 14, with the flange 72 of the plug device 14 abutting the extension 59 at the rear of the plug device 13. After insertion of the plug devices into the trap, the valve 6 is closed and the valve 7 is opened to allow the plug devices to enter the pipe line 1 and be moved therethrough responsive to flow of the pipe line fluid. The plug devices will move together under flow of the pipe line fluid until the stop face 75 of the foremost plug device 13 engages the inwardly projecting stop pins 84 of the stop means 76.

The progress of the plug devices through the pipe line is made apparent by the audible impulses produced on the pipe by the teeth 69 of the rollers 68. The teeth on the rollers of the foremost plug device 13 preferably have a differential spacing than the teeth of the rollers on the rearmost plug device 14, to make a different sound, so that should the rear plug device 14 tend to lag, the movement thereof relatively to the front plug device 13 will be heard by a worker walking along the pipe line progressively with movement of the plug devices. In this way, the progress of both plug devices can be followed until they reach the stop pins of the stop means 76 and 77.

Up to this time, the flexible flanges or lips 35 of the sealing cups 16, 17 and 18 of both plug devices are in trailing position, as shown in FIG. 6. When the stop faces 75 reach the stop pins of the stop means 76 and 77, the stop pins for the stop means 77 are projected by the crowding jacks until they are in position to be engaged by both stop faces 74 and 75, whereupon the rear plug device 14 is locked from movement in both directions. The stop pins 84 of the stop means 76 are then allowed to move outwardly under pressure of the pipeline fluid upon backing away of the crowder jacks 89 for the stop means 76. An extraneous fluid, such as water, is now introduced into the pipe line through the pipe 126 under sufficient pressure to reverse the flange or lip portions 35 of the cups 16, 17 and 18 of the rearmost plug device 14, as shown in FIG. 8, whereupon the pressure fluid passes around the periphery of the cup 18 and through the annular space surrounding the packing element 19 and around the reversed sealing cups 16 and 17, to act upon the sealing cups of the foremost plug device 13 to continue the advance thereof through the section of the pipe line to be repaired or replaced, with the plug device 13 pushing the pipe line fluid ahead thereof to the inlet of the pumping station 3 until the stop face 75 thereof engages the inwardly projecting stop pins 84 of the stop means 78, whereupon further progress of the plug device 13 is halted.

When the foremost plug 13 has reached the stop means 78, the stop pins 84 are moved into position to engage both stop faces 74 and 75 to lock the foremost plug device 13 from movement in either direction, similar to the plug device 14.

The packing elements 19 of the plug devices 13 and 14 are now in position to be expanded. This is effected by forcing the needles 110 through the bodies 53 of the packing elements 19 until the points 120 thereof have completely passed therethrough and are pressing the cushioning sleeves 51. The needles 110 are then connected with a source of pressure medium through the supply ducts 123 to discharge the inflating medium from the orifices 119 in the points 120 of the needles 110 to start expansion of the packing elements 19 into contact with the inner surface 36 of the pipe, as shown in FIG. 8. Sufficient pressure medium is admitted to securely plug the end portions of the pipe line and prevent leakage of pipe fluid therefrom.

During expansion of the packing elements 19, the segments 47 pivot outwardly therewith until the free ends thereof engage the wall of the pipe (see FIG. 8). During this movement, the bands 58 which retain the segments 47 in the collapsed position expand with movement of the segments 47. The segments 47, upon engaging the wall of the pipe, restrict endwise expansion of the packing elements 19 and prevent displacement of the material thereof under pressure.

With the plug devices 13 and 14 in place and the packing elements 19 thereof gripping the walls of the pipe, the valves 131 and 132 of the bypass 128 are opened and the valve 127 is closed so that the flow of pipe line fluid continues through the bypass 128. The small amount of mixing that may occur upon introduction of the pressure fluid through the pipe connection 126 is not objectionable. The needles 110 may be left in injecting position, since the packing elements automatically seal about the needles to hold the pressure medium. However, if desired, the needles may be withdrawn, since the holes produced by the needles will automatically close themselves and hold the inflating medium. It is preferred to leave the needles 110 in position until the repair is completed, because it is necessary to bleed the pressure medium from the packing elements by way of the needles after the repair is completed.

During repair or replacement of the section 10, the pressure expanded packing elements 19 effectively hold the pipe line pressure together with the gripping action of the segments 47 against the wall of the pipe. After the pipe line has been repaired or a new section welded into the pipe line at the points of cutoff 11 and 12, the pressure fluid trapped within the packing element 19 of the rearmost plug device 14 is exhausted through the needle 110 to allow the packing element to return to its initial collapsed position. The pressure medium is similarly exhausted from the packing element 19 of the plug device 13. Upon closing the valves 131 and 132, the pipe line intermediate the plug devices 13 and 14 will fill with pipe line fluid. The needles 110 are then withdrawn through the gate valves 100 and the gate valves are closed before the stop pins holding the plug devices are released.

After withdrawing the needles, the stops 84 of the stop means 77 are withdrawn from the pipe to free the plug device 14, whereupon that plug device will start and continue movement through the pipe line until the forward end thereof engages the rear end of the plug device 13. During start of this movement, the sealing cups of the plug device 14 return to their original position. The stop pins 84 of the stop means 78 are withdrawn to release the foremost plug device 13 for continued movement through the pipe line under pressure of the pipe line fluid discharged from the pumping station 2.

The valve 8 of the trap 5 at the pumping station 3 is opened so that when the plug devices reach the trap 5, they are diverted therein in the same manner as the usual plugs used for dividing flow of pipe line fluids, cleanout plugs, and the like. The plug devices are removable from the trap upon closing the valve 8 and opening of the valve 9.

After completion of the repair and reestablishment of the flow of pipe line fluid through the pipe line, the crowding devices 89 are backed from the collars 79 until the pressure has pushed the stop pins 84 against the shoulders 81', as shown in FIG. 10. The sleeve 91 and stem 88 of each stopping means is cut off at the end of the collar 79 and the parts welded over, as shown at 142, FIG. 11.

The needles 110 are then backed out through the sleeves 105 by backing off the crowding devices 113. The plug devices 104 are then inserted through the open upper end of the sleeves 105, after which the crowding devices 112 are replaced. The gate valves 100 are opened and the crowding devices 112 are turned to push the plug devices inwardly until the threaded ends are in position to enter the threaded recesses 103. Continued turning of the plug devices threads the plug 104 into the threaded recesses 103. Upon completely tightening the plugs 104, the shanks 111 snap off at the points 125. The sleeves 105 are then unthreaded from the gate valves, and the gate valves removed from the fittings 97 to leave the parts as shown in FIG. 13. If desired, the projecting portions of the plugs may be welded to the fittings, as shown by the weld 143, FIG. 13.

From the foregoing, it is obvious that I have provided a method and apparatus for effectively removing pipe line fluid from a section of a pipe line to be repaired, in such a manner that the fluid is moved downstream, thus eliminating the necessity of providing storage at the point of repair. It is also to be noted that the plug devices constructed as described effectively plug the ends of the line while the repair is being made, and that pipe line flow can be maintained through the bypass. Another important advantage is that the needles do not have to be exactly located with respect to the plug devices, because the needles will penetrate the packing elements anywhere between the segments 47 or anywhere around the peripheries thereof. Also, the stop pins are effective at any point around the stop faces 74 and 75 of the plug devices, so that it makes no difference if the plug devices should turn during travel within the pipe line.

What I claim and desire to secure by Letters Patent is:

1. The method of blocking off a section of pipe line, including introducing into the pipe line at a point upstream from said section a plug device having a packing element adapted to be inflated into contact with the inner surface of said section of the pipe line, introducing a propellant fluid into the pipe line upstream from the plug device to propel the plug device through the pipe line to the section to be blocked, stopping the plug device at the place to be blocked, introducing an inflating medium into the packing element for inflating the packing element into sealing contact with the inner surface of said section and retaining the inflating medium within the packing element to maintain said sealing contact.

2. The method of blocking off a section of pipe line and then reestablishing flow through said section, including introducing into the pipe line upstream from said section a plug device having a packing element adapted to be inflated into contact with the inner surface of said section of the pipe line, introducing a propellant fluid into the pipe line upstream from the plug device to propel the plug device through the pipe line, stopping the plug device at the place to be blocked, introducing an inflating medium into the packing element for inflating the packing element into sealing contact with the inner surface of said section, retaining the inflating medium within the packing element to maintain said sealing contact, exhausting the inflating medium from the packing element to free the plug device, and continuing flow of pipe line fluid to propel the plug device to a place of removal from the pipe line.

3. The method of blocking off a section of pipe line having an annular wall, including introducing into the pipe line at a point upstream from the section to be blocked a plug device having a packing element adapted to be inflated into contact with the inner surface of said section of the pipe line, introducing a propellant fluid into the pipe line upstream from the plug device to propel the plug device to the place to be blocked, stopping the plug device upon arrival at the place to be blocked, supplying an inflating medium exteriorly of the pipe line, connecting the supply of inflating medium with the packing element through the wall of the pipe line, flowing the inflating medium into the packing element for inflating the packing element into sealing contact with the inner surface of said section, retaining pressure of the inflating medium in the packing element from a point exteriorly of the pipe line to block flow in the section of the pipe line, exhausting the inflating medium through said connection to the exterior of the pipe line, removing said connection, and releasing the stopped plug device for removal through the pipe line by the propellant fluid.

4. The method of blocking a section of pipe line having an annular wall including introducing into an upstream portion of the pipe line a plug device having an inflatable packing element adapted to be inflated into contact with the inner surface of the section of the pipe line to be blocked, introducing a propellant fluid into the pipe line upstream from the plug device to propel the plug device through said pipe line to the section to be blocked, stopping the plug device in said section, projecting a hollow needle through the wall of said section of pipe line while preventing escape of fluid from the pipe line, piercing said packing element with said needle, and introducing an inflating medium through the needle into said packing element for inflating the packing element to establish sealing contact of the packing element with the inner surface of said section to complete the block.

5. The method of blocking off a section of pipe line having an annular wall, including introducing into the pipe line at a point upstream from the section to be blocked a plug device having an inflatable packing element for subsequent inflation into contact with the inner surface of said section of the pipe line, introducing a propellant fluid into the pipe line upstream from the plug device to propel the plug device to the place to be blocked, stopping the plug device in said place to be blocked, projecting a hollow needle through the wall of said section while preventing escape of fluid from the pipe line, projecting the needle through said packing element, introducing an inflating medium through the needle into said packing element for expanding the packing element into sealing contact with the inner surface of said section of the pipe line to block the pipe line fluid, exhausting the inflating medium through the needle to deflate said packing element, and continuing the flow of pipe line fluid to propel the plug device to a place of removal.

6. The method of blocking off a section of pipe line having an annular wall, including the steps of cutting an opening in the wall of the pipe line at the place to be blocked while retaining the pipe line fluid, introducing a stopping element through said opening into the continuing section of the pipe line, cutting a second opening in the wall of the continuing section while retaining the pipe line fluid, introducing into the pipe line at a point upstream a plug device having an inflatable packing element, introducing a propellant fluid into the pipe line upstream from the plug device to propel the plug device through the pipe line until the plug device reaches the stopping element, introducing a hollow needle through said second opening while retaining the pipe line fluid, piercing the packing element with said needle, and introducing an inflating medium through said needle to inflate said packing element into sealing contact with the inner surface of the pipe line.

7. The method of removing pipe line fluid from a section of pipe line and blocking the pipe line up and downstream from ends of said section, including the steps of introducing into the pipe line at a point upstream from said section plug devices in tandem and each having an inflatable packing element, introducing a propellant fluid into the pipe line upstream from the plug devices to propel the plug devices downstream, stopping the rear plug device before entrance of the rear plug device into said section, introducing a pressure fluid upstream from the foremost plug device to continue movement of the foremost plug device, removing the pipe line fluid from said section simultaneously with progress of the foremost plug device, stopping the foremost plug device after passage through said section, and inflating the packing elements of the plug devices.

8. The method of removing pipe line fluid from a section of a pipe line and blocking the pipe line up and downstream from ends of said section, including the steps of introducing into the pipe line at a point upstream from said section of the pipe line plug devices in tandem and each having an inflatable packing element and reversible sealing elements, introducing a propellant fluid into the pipe line upstream from the plug devices to push the plug devices through the pipe line, stopping the plug devices in the pipe line before entrance of the rear plug into said section of the pipe line, releasing the foremost plug device, increasing pressure of the propellant fluid to reverse the sealing elements of the rear plug device for passing the propellant fluid by the reversed sealing elements to propel the foremost plug device through said section of the pipe line for pushing the pipe line fluid thereahead, stopping the foremost plug device after passing said section of the pipe line, introducing an inflating medium into the packing elements of the plug devices to plug the up and the downstream portions of the pipe line, deflating the packing elements, reestablishing flow of the pipe line fluid, releasing the plug devices from said stopped positions, and continuing flow of the pipe line fluid to propel the plug devices to a place of removal.

9. The method of removing pipe line fluid from a section of pipe line and blocking the pipe line up and downstream from ends of said section, including the steps of introducing into the pipe line at a point upstream from said section plug devices in tandem and each having an inflatable packing element and reversible sealing elements, introducing a propellant fluid into the pipe line upstream from the lug devices to push the plug devices through the pipe line, stopping the plug devices in the pipe line before entrance of the rearmost plug device into said section, releasing the foremost plug device, increasing pressure of the propellant fluid to reverse the sealing elements of the rearmost plug device for passing the propellant fluid by the reversed sealing elements to propel the foremost plug device through said section for pushing the pipe line fluid thereahead, stopping the foremost plug device after passage thereof through said section of the pipe line, introducing an inflating medium into the packing elements of the plug devices to plug the up and the downstream portions of the pipe line, deflating the packing elements, reestablishing flow of the pipe line fluid while retaining the rearmost plug device in stopped position to fill said section with pipe line fluid, releasing the plug devices from said stopped positions, and continuing flow of the pipe line fluid to propel the plug devices through the pipe line to a place of removal.

10. The method of removing pipe line fluid from a section of a pipe line and blocking the pipe line up and downstream from ends of said section, including the steps of introducing into the pipe line at a point upstream from said section plug devices in tandem and each having an inflatable packing element and reversible sealing elements, introducing a propellant fluid into the pipe line upstream from the plug devices to push the plug devices through the pipe line, stopping the plug devices in the pipe line before entrance of the rearmost plug device into said section, releasing the foremost plug device, reversing the sealing elements of the rearmost plug device for passing the propellant fluid by the reversed sealing elements to propel the foremost plug device through said section for pushing the pipe line fluid thereahead, stopping the foremost plug device after passage thereof through said section, introducing an inflating medium into the packing elements of the plug devices to plug the up and the downstream portions of the pipe line, bypassing flow of the pipe line fluid from a point upstream from the rearmost plug to a point downstream from the foremost plug during the time that said section is blocked, closing the bypass, deflating the packing elements, reestablishing flow of the pipe line fluid to fill the section with pipe line fluid, releasing the plug devices from said stopped positions, and continuing flow of the pipe line fluid to propel the plug devices to a place of removal.

11. The method of removing pipe line fluid from a section of a pipe line and blocking the pipe line up and downstream from ends of said section, including the steps of introducing into the pipe line at a point upstream from said section plug devices in tandem and each having an inflatable packing element, propelling the plug devices downstream under flow of the pipe line fluid, stopping the rear plug device before entrance of the rear plug device into said section, introducing an exterior pressure fluid into the pipe line to propel the foremost plug device through said section to push the pipe line fluid thereahead, stopping the foremost plug device after passage from said section, inflating the packing elements to complete said blocking of the pipe line from the up and downstream ends of said section, shutting off the flow of exterior pressure fluid, deflating the packing elements, releasing the plug devices, and continuing flow of the pipe line fluid to propel the plug devices to a place of removal.

12. The method of removing pipe line fluid from a section of a pipe line and blocking the pipe line up and downstream from ends of said section, including the steps of introducing into the pipe line at a point upstream from said section plug devices in tandem and each having an inflatable packing element, propelling the plug devices downstream under flow of the pipe line fluid, stopping the rear plug device before entrance of the rear plug device into said section, introducing an exterior pressure fluid into the pipe line to propel the foremost plug device through said section to push the pipe line fluid thereahead, stopping the foremost plug device after passage from said section, inflating the packing elements to complete said blocking of the pipe line from the up and downstream ends of said section, shutting off the flow of exterior pressure fluid, bypassing the pipe line fluid from a point on the upstream side of the rear plug to a point on the downstream side of the foremost plug during blocking off of said section, deflating the packing elements, releasing the plug devices, suspending the bypass of the pipe line fluid, and continuing flow of the pipe line fluid through said section to propel the plug devices to a place of removal.

13. A pipe line plug device, including a core, an inflatable packing element encircling the core, cups on the core at the ends of the packing element and having flexible flange portions adapted to form seals with the inner surface of a pipe line having an annular wall to support the core axially within the pipe line and for effecting movement of the plug device into plugging position responsive to flow of a pressure fluid within the pipe line, means for connection with said wall of the pipe line in said plugging position for providing an opening through the wall of the pipe line while retaining the pressure fluid in the pipe line, and means for introducing a pressure fluid through said opening and into the inflatable packing element to expand the packing element into contact with said wall of the pipe for anchoring the plug device in said plugging position.

14. A pipe line plug device as defined in claim 13, wherein the plug includes an audible signaling means carried by the core for indicating movement of the plug device to said plugging position.

15. A pipe line plug device, including a core, an inflatable packing element encircling the core, cups on the core at the ends of the packing element and having flexible flange portions adapted to form seals with the inner surface of the pipe line having an annular wall to support the core axially within a pipe line and for effecting movement of the plug device into plugging position responsive to flow of pressure fluid within the pipe line, means for connection with said wall of the pipe line in said plugging position for providing an opening through the wall of the pipe line while retaining the pressure fluid in the pipe line, a hollow needle, means for projecting the hollow needle through said opening and through the material of the inflatable packing element, and means in connection with the needle for introducing an inflating medium into the packing element to expand the packing element into contact with said wall of the pipe for anchoring the plug device in said plugging position.

16. A pipe line plug device as defined in claim 15, wherein the inflatable packing element is of self sealing material to be self sealing with the needle and to close the opening made by the needle when the needle is withdrawn.

17. A pipe line plug device, including a core, an annular packing element encircling the core, means on the core for supporting the packing element axially within a pipe line and for effecting movement of the plug device into plugging position responsive to flow of pressure fluid within the pipe line, means for connection with the pipe line for providing an opening into the pipe line while retaining the pressure fluid in the pipe line, a hollow needle, means for projecting the hollow needle through said opening and through the annular packing element, and means in connection with the hollow needle for introducing an inflating medium through the needle to inflate the packing element into contact with the pipe for anchoring the plug device in said plugging position.

18. In combination, a pipe line plug device, including a core, an annular packing element encircling the core, means on the core for supporting the packing element axially within a pipe line and for effecting movement of the plug device into plugging position responsive to flow of pressure fluid within the pipe line, means for connection with the pipe line at a circumferential point in registry with said packing element when said plug device is in said plugging position for providing an opening into the pipe line, a hollow needle, means for projecting the hollow needle through said opening and through the annular packing element, means connected with the hollow needle for introducing an inflating medium through the needle to inflate the packing element for anchoring the plug device in said plugging position, and means on the core and expandable with the packing element to restrict expansion of the packing element in an endwise direction.

19. A pipe line plug device for insertion into a pipe line, including a core, an inflatable packing element encircling the core, spacers on the core at the ends of the packing element and having annular grooves facing the ends of the packing element, an annular series of segments having ends supported in the grooves and lapping the ends of the packing element to restrict endwise expansion of the packing element, and cups on the ends of the core adapted for sealing contact with the inner circumferential surface of the pipe line for supporting the core coaxially within the pipe line and for effecting movement of the plug device into plugging position responsive to flow of pressure fluid within the pipe line.

20. A pipe line plug device, including a core, an inflatable packing element encircling the core and of a material to be self sealing when punctured, spacers on the core at the ends of the packing element and having annular grooves facing the ends of the packing element, an annular series of segments having ends supported in the grooves and lapping the ends of the packing element, cups on the ends of the core and adapted for annular sealing contact with the inner circumferential surface of a pipe line for supporting the core coaxially within the pipe line and for effecting movement of the plug device to a plugging position within the pipe line responsive to flow of pressure fluid within the pipe line, means for connection with the pipe line in said plugging position for providing an opening into the pipe line while retaining the pressure flud in the pipe line, a hollow needle, means for projecting the hollow needle through said opening and through the annular packing element, and means for introducing an inflating medium through the needle to inflate the packing element and to spread the free ends of the segments into contact with the inner circumferential surface of the line to confine expansion of the packing element to the circumferential direction thereof for anchoring the plug device in the pipe line and to prevent lengthwise deformation of the packing element under the pressure of the pipe line fluid.

21. A pipe line plug device, including a core, an annular packing element encircling the core, means on the core for clamping ends of the annular packing element to the core for providing pressure tight connections between the ends of the annular packing element and the core, cups on the core at the ends of the packing element and having flexible flange portions adapted to form seals with the inner surface of a pipe line having an annular wall to support the core axially within the pipe line and for effecting movement of the plug device into plugging position responsive to flow of pressure fluid within the pipe line, means for connection with said wall of the pipe line in said plugging position for providing an opening through the wall of the pipe line while retaining the pressure fluid in the pipe line, a hollow needle, means for projecting the hollow needle through said opening and through the annular packing element, and means for introducing an inflating medium through the needle to inflate the packing element into contact with said wall of the pipe for anchoring the plug device in said plugging position.

22. An apparatus for removing pipe line fluid from a section of pipe line to be repaired and for blocking pipe line up and downstream from ends of the section to be repaired, said apparatus including plug devices in tandem relation and each having an inflatable packing element of normal diameter less than the internal diameter of the pipe line and sealing elements for contacting the inner surface of the pipe line, said plug devices being adapted for insertion into the pipe line upstream from the section to be repaired and propelled by pressure fluid flowing through the pipe line and acting upon the sealing elements, stop means for connection with the pipe line near the upstream end of the section of the pipe line to be repaired for stopping the plug devices, a second stop means adapted for connection with the pipe line for holding the rearmost plug device, means for admitting a pressure fluid into the pipe line for propelling the foremost plug device through the pipe line section to be repaired after release thereof for moving pipe line fluid thereahead, stop means for projection into the pipe line at the downstream end of the section to be repaired for stopping the foremost plug device, drill means for drilling openings in the wall of the pipe in registry with said packing elements of the plug devices, hollow needles for projection through said openings into piercing contact with said packing elements, and duct means connected with the hollow needles for introducing an inflating medium through the hollow needles for inflating said packing elements into gripping contact with the inner surface of the pipe.

23. An apparatus for removing pipe line fluid from a section of pipe line to be repaired and for blocking sections of pipe line that are respectively connected with up and downstream ends of said section to be repaired, said apparatus including tandem plug devices each having an inflatable packing element of normal diameter less than the internal diameter of the pipe line and reversible sealing elements having sealing contact with the inner surface of the pipe line, said plug devices being for insertion into the pipe line upstream from the section to be repaired and propelled by pressure fluid flowing through the pipe line, stop means for projection into the pipe line near the upstream end of the section of the pipe line to be repaired for stopping the plug devices in tandem, a second stop means for projection into the pipe line for holding the rearmost plug device to build up pressure sufficient to reverse the sealing elements on the rearmost plug for passing the pressure fluid into contact with the sealing elements of the foremost plug to propel the foremost plug through the pipe line section to be repaired after release of the first named stop means for displacing pipe line fluid thereahead into the section that is in connection with the downstream end of the section to be repaired stop means for projection into said section at the downstream end of the section to be repaired for stopping the foremost plug device, drill means for drilling openings into the pipe in registry with said packing elements of the plug devices, hollow needles adapted to be projected through said openings into piercing contact with said packing elements, and duct means connected with said needles for introducing an inflating medium through the hollow needles for inflating said packing elements into gripping contact with the pipe.

24. A pipe line plug, including a tubular core having spaced apart annular ribs intermediate ends thereof, a sleeve of cushioning material supported on the core intermediate the ribs, clamping rings on the core at the outer sides of the ribs and having portions projecting over the ribs and engaging ends of said sleeve, a packing element surrounding the cushioning sleeve and having ends lapping the clamping rings provided with tapering outer faces, washers on the core having flanges extending over the tapering faces of the packing element to cooperate with the clamping rings to clamp the ends of the packing element therebetween and provide pressure tight connections between the core and the packing element, spacers on the core backing the clamping rings and having annular recesses in the facing sides thereof, an annular series of segments having ends anchored in said recesses and overlying the tapered ends of the packing element, resilient means for retaining the segments in contact with the tapering faces of the packing element, cups on the core at the outer sides of the spacers and having flexible annular flange portions adapted to provide a sealing contact with the inner surface of the pipe line and to normally support the packing element out of contact with the inner surface of the pipe line, a hollow needle adapted to be projected through an opening of the pipe line to pierce the packing element and depress the cushioning material of said sleeve, and duct means connected with the hollow needle for introducing an inflating medium through the hollow needle to inflate the packing element and to bring the segments into contact with the wall of the pipe line to confine expansion of the packing element into sealing contact with the surface of said wall.

25. A pipe line plug, including a core, an annular packing element encircling the core, cups on the core and having flexible annular flange portions for providing sealing contact with the inner surface of a pipe line, heads on the ends of the core, the marginal edge of the forward of said heads providing a stop contacting face, an annular flange carried by the forward head and having a radial flange spaced therefrom and of less diameter than said head to provide a stop contact face, and stops for projection into a pipe line in which the pipe line plug is to be used for engaging said stop contacting faces for holding the plug device from movement in either direction in said pipe line.

References Cited in the file of this patent

UNITED STATES PATENTS 2,786,489     Morrill ---------------- Mar. 26, 1957

Notice of Adverse Decision in Interference

In Interference No. 93,630 involving Patent No. 3,040,779, W. C. Guier, METHOD AND APPARATUS FOR BLOCKING OFF AND EMPTYING A SECTION OF PIPE LINE, final judgment adverse to the patentee was rendered Nov. 30, 1965, as to claims 1, 2, 3, 7, 11, 13 and 25.

[*Official Gazette May 17, 1966.*]